(12) United States Patent
Jopson et al.

(10) Patent No.: US 7,590,355 B2
(45) Date of Patent: Sep. 15, 2009

(54) METHOD AND APPARATUS FOR PMD MITIGATION IN OPTICAL COMMUNICATION SYSTEMS

(75) Inventors: Robert Jopson, Rumson, NJ (US);
Herwig Kogelnik, Rumson, NJ (US);
Peter Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 649 days.

(21) Appl. No.: 11/307,918

(22) Filed: Feb. 28, 2006

(65) Prior Publication Data

US 2006/0216036 A1 Sep. 28, 2006

Related U.S. Application Data

(63) Continuation-in-part of application No. 11/073,061, filed on Mar. 4, 2005, now abandoned.

(51) Int. Cl.
*H04B 10/12* (2006.01)
*H04J 14/02* (2006.01)
*H04J 14/06* (2006.01)

(52) U.S. Cl. .......................... 398/148; 398/65; 398/81; 398/152; 398/159

(58) Field of Classification Search .................. 398/29, 398/33, 65, 81, 147, 148, 152, 158, 159, 398/194
See application file for complete search history.

(56) References Cited

U.S. PATENT DOCUMENTS 6,594,408 B1 7/2003 Noe

| | | | |
|---|---|---|---|
| 6,603,890 B2 * | 8/2003 | Khosravani et al. | 385/11 |
| 2001/0024538 A1 * | 9/2001 | Khosravani et al. | 385/11 |
| 2001/0055437 A1 | 12/2001 | Khosravani et al. | |
| 2002/0122169 A1 * | 9/2002 | Lee et al. | 356/73.1 |
| 2005/0175339 A1 * | 8/2005 | Herskowits et al. | 398/1 |

OTHER PUBLICATIONS

R. Caponi et al., WDM System Impairments Due to Highly-Correlated PMD Spectra of Buried Optical Cables, Elec. Ltrs. vol. 38, No. 14, Jul. 4, 2002.
C.Antonelli et al., "Statistics of the DGD in PMD Emulators", Photonics Tech. Lett., 16, pp. 1840-1842, Aug. 2004.
M.Boroditsky et al., "Outage Probabilities for Fiber Routes With Finite Number of Degrees of Freedom", Photonics Tech. Lett., 17, pp. 345-347, Feb. 2005.
P.J.Winzer et al., "Precise Outage Specifications for First-Order PMD", Photonics Tech. Lett., 16, pp. 449-451, Feb. 2004.
M.Brodsky et al., "Polorization-Mode Dispersion of Installed Recent Vintage Fiber as a Parametric Function of Temperature", Photonics Tech. Lett., 16, pp. 209-211, Jan. 2004.
A.Mecozzi et al., "Chacterization of the time dependence of polarization mode dispersion", Optics Lett., 29, pp. 2599-2601, Nov. 15, 2004.

(Continued)

*Primary Examiner*—Dalzid Singh

(57) ABSTRACT

A scheme is described for mitigating the effects of polarization-mode dispersion (PMD) in a wave-division multiplex (WDM) optical communication system having one or more transmission links with one or more quasi-static waveguide sections coupled by one or more non-static coupling sections. A transmitter is coupled to the transmission link and is adapted to transmit optical signals through the transmission link with wavelength channel spacing of the optical signals greater than about the PMD correlation bandwidth of at least one of the one or more quasi-static waveguide sections, so that the PMD induced outage probability for the system is optimized.

21 Claims, 3 Drawing Sheets

OTHER PUBLICATIONS

M. Brodsky et al., "Persistence of spectral varations in DGD statistics", Optics Express, 13, pp. 4090-4095, May 30, 2005.

H. Bulow et al., "Operation of digital optical transmission system with minimal degradation due to polarisation mode dispersion", Electron. Lett., 31, pp. 214-215, Feb. 2, 1995.

R. Caponi et al., "WDM design issues with highly correlated PMD spectra of buried optical cables", OFC 2002., pp. 453-455, Mar. 17-22, 2002.

H. Kogelnik et al., "First-Order PMD Outage for the Hinge Model", Photonics Tech. Lett., 17, pp. 1208-1210, Jun. 2005.

* cited by examiner

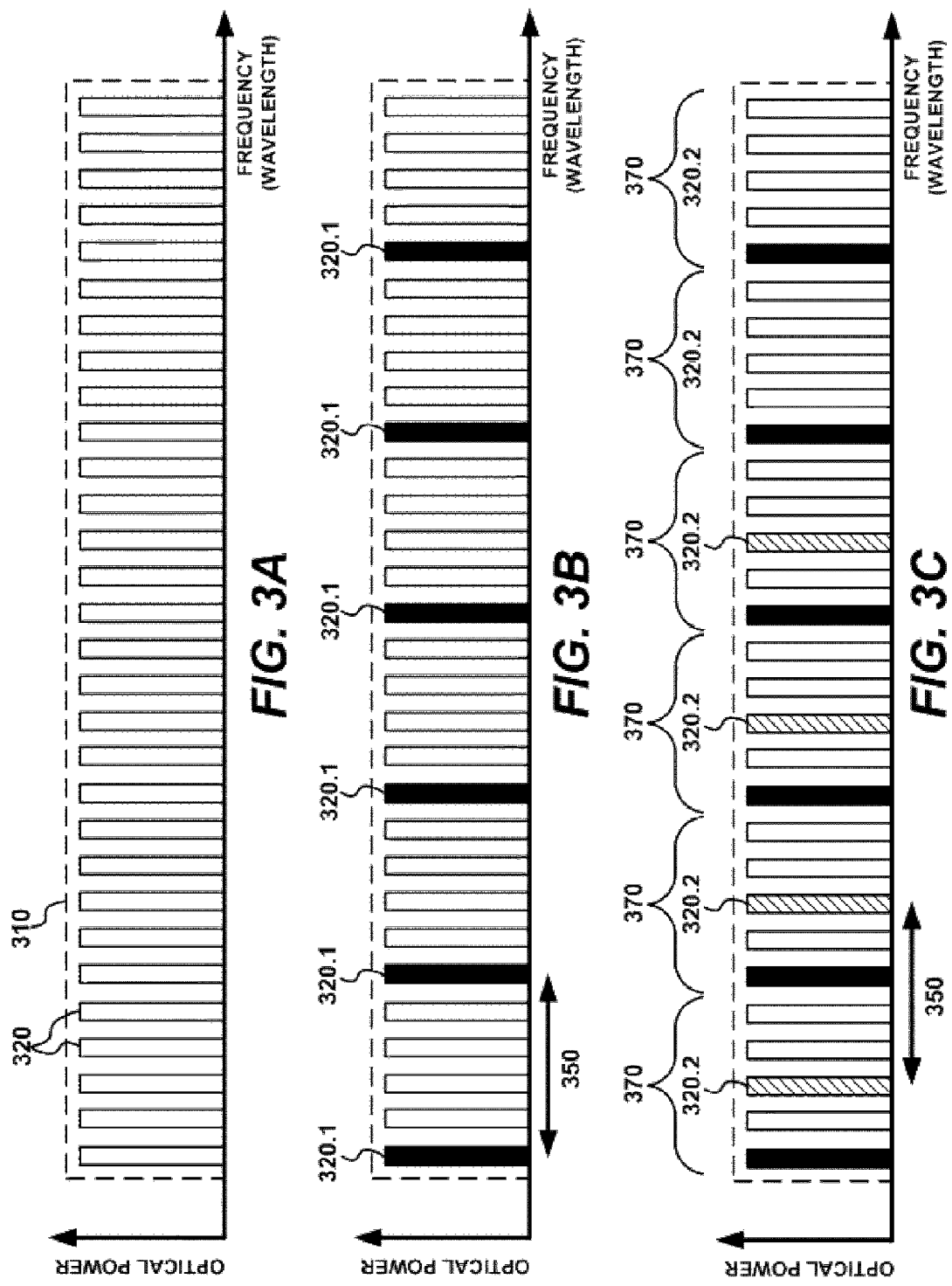

METHOD AND APPARATUS FOR PMD MITIGATION IN OPTICAL COMMUNICATION SYSTEMS

CROSS-REFERENCE TO RELATED APPLICATIONS

The present application is based on and claims priority from U.S. patent application Ser. No. 11/073,061, which was filed Mar. 4, 2005 and which is incorporated herein by reference in its entirety.

FIELD OF THE INVENTION

The present invention relates to the field of high-speed optical communications, and more specifically to methods and apparatus for the mitigation of polarization-mode-dispersion (PMD) in optical communication systems.

BACKGROUND INFORMATION

Deviations from the nominal circular symmetry of optical fiber lead to birefringence, resulting in different group velocities for orthogonal polarization modes. Two polarization components of an optical signal thus experience some differential group delay (DGD), which may also change with wavelength. Since optical receivers typically detect the total optical power, irrespective of polarization, DGD manifests itself in pulse spreading, called polarization-mode dispersion (PMD). For a DGD of approximately 10% of the bit period of an optical signal (the exact number depending on modulation format and receiver properties), pulses begin to spread significantly, extending into neighboring bit slots and causing bit errors. Time-varying stresses exerted on the fiber (e.g., mechanical vibrations, temperature variations) randomly change the DGD. Typical rates of change range from milliseconds (due to e.g., acoustic vibrations) to months (for e.g., buried fiber).

PMD-induced signal distortions vary randomly in time, and may lead to error bursts disrupting communication. By the nature of PMD, the amount of signal distortion can be exceedingly large, yet with a very low probability of occurrence. Therefore, systems may occasionally fail, even if high link budget margins are allocated to combat PMD. Given this stochastic behavior of PMD, the typical approach to mitigate the effects of PMD has been to allocate a certain margin to accommodate most instances of PMD-induced signal distortions while leaving the system vulnerable to those random instances in which PMD exceeds this margin. The system's robustness to PMD is then quantified by an outage probability, defined as the probability of PMD-induced error bursts not accommodated for by the allocated margin.

Using traditional models, outage probabilities can be calculated by specifying the deterministic PMD tolerance of a transmitter-receiver pair, and then invoking Maxwellian statistics for the DGD. In this model, Maxwellian statistics apply over time as well as across channels in a wavelength-division multiplexed (WDM) system, and can be used to compute and specify system outage probabilities. Recent studies on the PMD characteristics of a deployed fiber plant suggest a different model with different statistics. (See, e.g., R. Caponi et al., "WDM Design Issues With Highly Correlated PMD Spectra of Buried Optical Cables," OFC 2002, pp. 453-455.)

As illustrated schematically in FIG. 1, according to the so-called "hinge model," a typical transmission link 100 consists of several (e.g., 5 to 10) relatively stable, long fiber sections 110 that are well sheltered from the environment over extended periods of time (e.g., months). The sections 110 are referred to as quasi-static waveguide sections or stable fiber sections. On such time scales, the PMD characteristics of these sections are not significantly impacted by temperature variations or mechanical vibrations.

The stable fiber sections 110 are connected by pieces of environmentally unprotected fiber 120 such as dispersion compensating modules at repeater sites, fiber patchcords in switching offices, or lengths of fiber proximate to sources of mechanical vibrations. Such pieces of fiber are referred to as non-static coupling sections or "hinges". The polarization characteristics of hinges vary rapidly in time.

The hinge model attempts to characterize the PMD statistics of such fiber links. The DGD of the long and stable sections still has a Maxwellian probability density function (PDF) in the wavelength dimension, and essentially does not vary in time. The overall PDF of the link DGD, however, is not Maxwellian. In particular, the DGD at any given wavelength has an upper bound, and each wavelength band (comprising one or more channels) has a different outage probability. Some wavelength bands will comply with a prescribed outage specification while others will not. In other words, no matter what outage probability is specified for a WDM system, a fraction of WDM channels will always violate that outage specification (i.e., a fraction of channels will have a higher-than-specified outage probability). This fraction is quantified by the "non-compliant capacity ratio" (NCR). (See H. Kogelnik et al., "First-Order PMD Outage for the Hinge Model," IEEE Photonics Technology Letters., Vol. 17, No. 6, June 2005.)

FIG. 2 illustrates the implications of the applicability of the hinge model for the NCR of a typical transmission link with multiple sections. Plot 10 represents the case of the classical model whereas plot 20 represents the hinge model. These plots were derived for a 40 Gb/s fiber link composed of 6 sections (5 hinges), with a mean link DGD of 5 ps, and RZ-OOK modulation. As shown in FIG. 2, the classical model predicts an outage probability of $10^{-4}$. This value applies to all WDM channels individually in a statistically independent manner. Under the hinge model, however, for the same link DGD, more than 25% of all WDM channels will be non-compliant, i.e., they will not meet the $10^{-4}$ outage specification. On the other hand, approximately 75% of all WDM channels will perform better than specified, and about 45% of all channels will be totally outage-free.

In accordance with the hinge model, the DGD values of each quasi-static section of a link are different for each statistically independent wavelength band. Bands may each contain one or more WDM channels and are considered statistically independent or uncorrelated when their spectral separation exceeds the PMD correlation bandwidth. Depending on how the correlation bandwidth is defined, the PMD correlation bandwidth is approximately between two and six times the bandwidth of the principal state of polarization ($B_{PSP}$) of a quasi-static link section. WDM channels within a PMD correlation bandwidth are considered to be statistically dependent (or correlated) and will experience the same DGD and outage probability. As such, the NCR pertains to the ensemble of bands making up a WDM system rather than to the individual WDM channels.

Furthermore, as mentioned, while the DGD values of each quasi-static section of a link vary relatively slowly in time (e.g., days to months), they do nonetheless vary. As the DGD values vary, the set of bands that will be non-compliant will also vary. In other words, while the non-compliant capacity (as represented by the NCR) may stay relatively constant, the individual bands constituting that non-compliant capacity will change over time.

In accordance with the hinge model, a multi-section optical communications link will periodically experience severe degradations in performance if all or a significant portion of the WDM channels fall within the non-compliant capacity of the link.

SUMMARY OF THE INVENTION

The present invention is directed to an optical communications system and a method of operating same that takes into account the PMD-related outage behavior of the system as predicted by the hinge model to mitigate the impact of PMD. According to an exemplary embodiment of the present invention, an optical communication system is provided comprising a transmission link including one or more quasi-static waveguide sections coupled by one or more non-static coupling sections. A transmitter coupled to the transmission link is adapted to transmit optical signals through the transmission link with wavelength channel spacing of the optical signals greater than approximately the PMD correlation bandwidth of at least one of the quasi-static waveguide sections, such that the PMD induced outage probability for the system is optimized.

BRIEF DESCRIPTION OF THE DRAWINGS

FIGS. 3A through 3C illustrate an exemplary WDM channel allocation scheme in accordance with the present invention.

DETAILED DESCRIPTION

Figure 1:
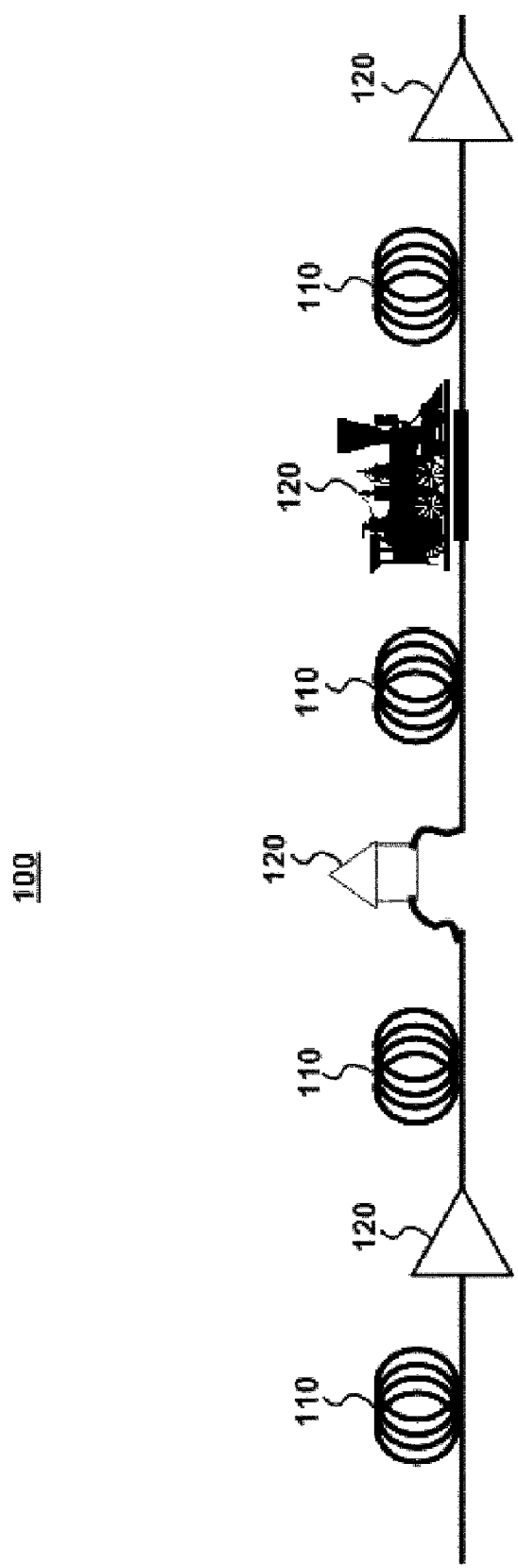
FIG. 1 is a schematic representation of an illustrative WDM link having multiple quasi-stationary and non-stationary waveguide sections.
Figure 2:
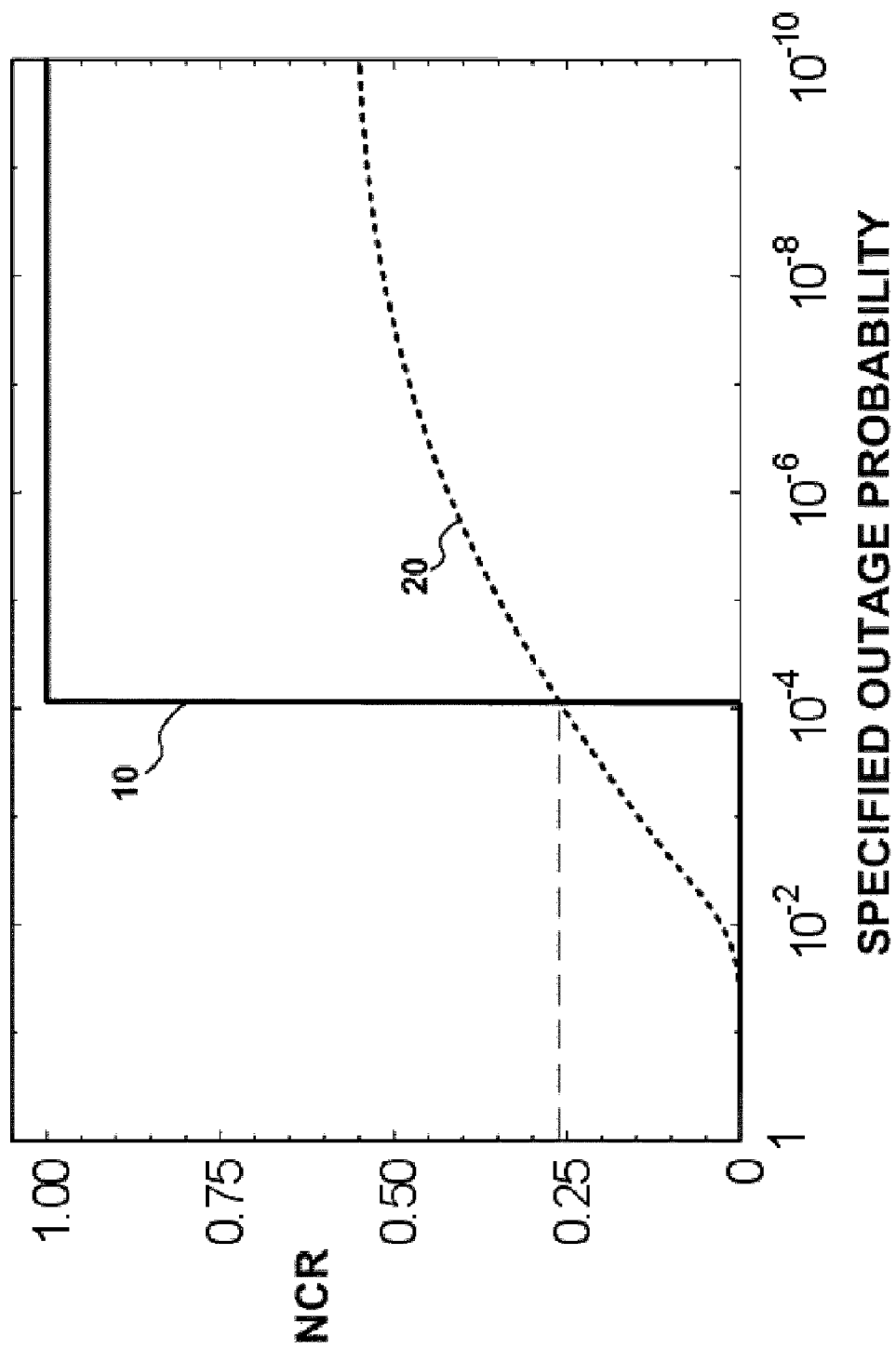
FIG. 2 is a graph of the non-compliant capacity of an exemplary multi-section link as a function of specified outage probability under the classical and hinge models.

FIGS. 3A through 3C illustrate an exemplary method of assigning WDM channels in an exemplary link so as to mitigate the effects of PMD. The entire wavelength range of frequencies 310 supported by the link contains multiple WDM channels 320. In accordance with the present invention, when traffic is assigned to WDM channels, WDM channels belonging to a first set of channels 320.1, shown with solid shading in FIG. 3B, are deployed first. The first set of channels 320.1 are selected so as to be spaced apart by a frequency (or wavelength) spacing 350. The spectral spacing 350 is preferably selected so that the WDM channels 320.1 are statistically uncorrelated with each other.

WDM channels are statistically uncorrelated when their spectral separation exceeds the PMD correlation bandwidth of the link. Depending on the definition of the correlation bandwidth, the PMD correlation bandwidth is approximately between two and six times the bandwidth of the principal state of polarization ($B_{PSP}$) of one quasi-static link section. As such, in the exemplary channel assignment scheme illustrated in FIGS. 3A-3C, the spectral spacing 350 is preferably greater than approximately $6B_{PSP}$. The bandwidth of the PSP ($B_{PSP}$) is given by:

$$B_{PSP} = 125 \text{ GHz/Mean static section } DGD[\text{ps}] \quad \text{(Eq. 1)}$$

For links with N quasi-static sections of equal mean section DGD, the mean static section DGD determined from the mean link DGD as follows:

$$\text{Mean static section } DGD = \text{Mean link } DGD/N^{1/2} \quad \text{(Eq. 2)}$$

Table I below shows the frequency spacing for statistically independent WDM channels of an exemplary link having various numbers of quasi-static sections for the case of a mean link DGD of 5 ps, chosen as an example for a 40-Gb/s system.

TABLE I

| Number of sections (N) | Spacing (350) of statistically independent WDM channels (GHz) |
|---|---|
| 1 | 150 |
| 3 | 260 |
| 6 | 367 |
| 10 | 474 |

The spacing between the WDM channels 320.1 can be uniform (i.e., the spacing between all adjacent pairs of channels 320.1 is the same) or not, as long as the spacing is at least as large as the spacing 350. Furthermore, the channels 320.1 need not be deployed in any particular order.

In the exemplary embodiment illustrated in FIGS. 3A-3C, the spectral spacing 350 spans five WDM channels. As can be appreciated, the number of WDM channels spanned by the spectral spacing 350 can vary depending on the size of the spectral spacing 350 and the spacing of the WDM channels.

In accordance with the exemplary method of the present invention, once all of or at least most of the WDM channels 320.1 have been deployed, a second set of channels 320.2 (see FIG. 3C) can then be deployed. As with the WDM channels 320.1, the channels 320.2 are selected so as to be spaced apart from each other by at least the spacing 350. (For illustrative purposes, FIG. 3C shows a portion of the channels 320.2 deployed; i.e., four of a possible six channels.)

The second set of WDM channels 320.2 is selected so as to preferably maximize their spacing from the first set of channels 320.1 already deployed. Thus, for example, in the exemplary scheme illustrated in FIGS. 3A-3C, the set of WDM channels 320.2 can be shifted one channel to the left from the positions shown.

The remaining WDM channels 320 are deployed as described above with respect to the sets of channels 320.1 and 320.2. This scheme reduces the link's susceptibility to PMD-induced outages in the framework of the hinge model by minimizing, to the extent possible, the correlation among the WMD channels deployed. This substantially reduces the possibility of having 100% of the channels of a link fail because of a PMD-induced outage, as would be the case if all channels deployed were closely spaced, i.e. within a band, and thus correlated. Under the scheme of the present invention, only a fraction of the deployed channels would likely be affected by a PMD-induced outage, as quantified by the NCR.

Note, however, that after the first set of channels 320.1 has been completely deployed, additional channels deployed as part of subsequent sets will be within the spacing 350 from the already deployed channels. In other words, there will now be channels that are correlated (e.g., each of the four deployed channels 320.2 shown in FIG. 3C will be correlated with the adjacent channels 320.1). Correlated WDM channels can be said to belong to a correlation group or band, such as the groups of channels 370 shown in FIG. 3C. When deploying channels in accordance with the present invention, it is preferred that the number of WDM channels within the bands be as equal as possible. During channel growth, however, some sub-bands will have N channels, while others will have N+1 channels.

Knowing that a certain fraction of WDM channels will always violate the outage specification, a certain number of PMD protection channels can be deployed together with appropriate monitoring and switching mechanisms to provide good transmission quality for all primary channels, even in the presence of non-compliance. Thus, for example, provisioning 133 channels will provide for 100 compliant channels when the NCR is approximately 25%. In order for the NCR to apply and for such "over-provisioning" to be effective, however, the correct ratio between correlated and uncorrelated WDM channels should be maintained as channels are assigned. In case of a transmission system with unequal WDM channel groupings within different sub-bands, the over-provisioning must reflect the proportion of the groupings. (This addresses the unequal channel deployment problem mentioned above.) Thus, for example, in a link having ten primary bands and three protection bands, where the ten primary bands consist of six bands with three assigned channels each and four bands with two assigned channels each, the three protection bands will consist of two bands with three channels each and one band with two channels.

In a further embodiment, shared PMD compensation can be employed as an alternative to over-provisioning. Within a band of correlated WDM channels, PMD compensators can be deployed for the maximum number of deployed WDM channels within the fraction of bands that are non-compliant. Thus, for example, in a system with an NCR of 25% having ten bands of five WDM channels each, out of which three bands are equipped with three WDM channels each and seven bands are equipped with two WDM channels each, three PMD compensators can be deployed to which the PMD-affected channels can be switched.

The PMD compensators within a band can be implemented, for example, as multiple, first-order compensators or as a single higher-order compensator. A compensator can be regarded as a reversed emulator of the hinge model. This could be done with one dedicated compensator for each band, or with compensators for only an NCR of the bands, including monitoring and switching as needed.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of mitigating polarization-mode dispersion (PMD) in a wavelength-division multiplexed (WDM) optical communications system having at least one transmission link with at least one quasi-static waveguide section coupled by one or more non-static coupling sections, the method comprising:
    transmitting optical signals through at least one transmission link on multiple WDM channels, the WDM channels having a spectral spacing of at least approximately a PMD correlation bandwidth of the at least one quasi-static waveguide section, whereby a PMD induced outage probability is optimized,
    wherein the multiple WDM channels comprise a first set of WDM channels and a second set of WDM channels, the first set of WDM channels having a spectral spacing between adjacent WDM channels of the first set of at least approximately the PMD correlation bandwidth and the second set of WDM channels having a spectral spacing between adjacent WDM channels of the second set of at least approximately the PMD correlation bandwidth.

2. The method of claim 1, wherein the WDM channels of the second set are deployed after at least most of the available WDM channels of the first set have been deployed.

3. The method of claim 1, wherein at least one WDM channel of the first set and at least one WDM channel of the second set have a spectral separation less than the PMD correlation bandwidth.

4. The method of claim 1, wherein the PMD correlation bandwidth is approximately between two and six times the bandwidth of a principal state of polarization of a quasi-static waveguide section.

5. The method of claim 1 comprising providing one or more protection WDM channels.

6. The method of claim 5, wherein the ratio of the number of protection WDM channels to the total number of WDM channels of the transmission link is approximately equal to a non-compliance ratio of the transmission link.

7. The method of claim 1 comprising providing at least one PMD compensator.

8. A system for mitigating polarization-mode dispersion (PMD) in a wavelength-division multiplexed (WDM) optical communications system having at least one transmission link with at least one quasi-static waveguide section coupled by one or more non-static coupling sections, the system comprising:
    means for transmitting optical signals through the at least one transmission link on multiple WDM channels, the WDM channels having a spectral spacing of at least approximately a PMD correlation bandwidth of the at least one quasi-static waveguide section, whereby a PMD induced outage probability is optimized,
    wherein the multiple WDM channels comprise a first set of WDM channels and a second set of WDM channels, the first set of WDM channels having a spectral spacing between adjacent WDM channels of the first set of at least approximately the PMD correlation bandwidth and the second set of WDM channels having a spectral spacing between adjacent WDM channels of the second set of at least approximately the PMD correlation bandwidth.

9. The system of claim 8, wherein the WDM channels of the second set are deployed after at least most of the available WDM channels of the first set have been deployed.

10. The system of claim 8, wherein at least one WDM channel of the first set and at least one WDM channel of the second set have a spectral separation less than the PMD correlation bandwidth.

11. The system of claim 8, wherein the PMD correlation bandwidth is approximately between two and six times the bandwidth of a principal state of polarization of a quasi-static waveguide section.

12. The system of claim 8 comprising one or more protection WDM channels.

13. The system of claim 12, wherein the ratio of the number of protection WDM channels to the total number of WDM channels of the transmission link is approximately equal to a non-compliance ratio of the transmission link.

14. The system of claim 8 comprising at least one PMD compensator.

15. A wavelength-division multiplexed (WDM) optical communications system comprising:
    at least one transmission link, the at least one transmission link including one or more quasi-static waveguide sections coupled by one or more non-static coupling sections; a transmitter adapted to transmit optical signals through the at least one transmission link on multiple WDM channels, the WDM channels having a spectral spacing of at least approximately a polarization-mode dispersion (PMD) correlation bandwidth of the at least one quasi-static waveguide section, whereby a PMD induced outage probability is optimized, wherein the multiple WDM channels comprise a first set of WDM channels and a second set of WDM channels, the first set of WDM channels having a spectral spacing between adjacent WDM channels of the first set of at least approximately the PMD correlation bandwidth and the second set of WDM channels having a spectral spacing between adjacent WDM channels of the second set of at least approximately the PMD correlation bandwidth.

16. The system of claim 15, wherein the WDM channels of the second set are deployed after at least most of the available WDM channels of the first set have been deployed.

17. The system of claim 15, wherein at least one WDM channel of the first set and at least one WDM channel of the second set have a spectral separation less than the PMD correlation bandwidth.

18. The system of claim 15, wherein the PMD correlation bandwidth is approximately between two and six times the bandwidth of a principal state of polarization of a quasi-static waveguide section.

19. The system of claim 15 comprising one or more protection WDM channels.

20. The system of claim 19, wherein the ratio of the number of protection WDM channels to the total number of WDM channels of the transmission link is approximately equal to a non-compliance ratio of the transmission link.

21. The system of claim 15 comprising at least one PMD compensator.

* * * * *